(12) United States Patent
Vasudevan et al.

(10) Patent No.: US 7,868,059 B2
(45) Date of Patent: Jan. 11, 2011

(54) POLYMERIZABLE DYE-MONOMER CONJUGATES FOR ENCAPSULATING PIGMENT PARTICLES

(75) Inventors: Sundar Vasudevan, Corvallis, OR (US); James P. Shields, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/829,593

(22) Filed: Jul. 27, 2007

(65) Prior Publication Data

US 2009/0025601 A1    Jan. 29, 2009

(51) Int. Cl.
C09D 11/00 (2006.01)
C08K 9/00 (2006.01)
C08L 33/06 (2006.01)

(52) U.S. Cl. ................ 523/160; 523/161; 523/205; 524/560; 106/31.13; 106/31.25; 106/31.28; 106/31.33

(58) Field of Classification Search .............. 523/160, 523/161, 205; 106/31.65, 31.13, 31.25, 31.28, 106/31.33; 524/560
See application file for complete search history.

(56) References Cited

U.S. PATENT DOCUMENTS

| | | | |
|---|---|---|---|
| 3,337,288 A | 8/1967 | Shojiro et al. | |
| 3,904,562 A * | 9/1975 | Hopfenberg et al. | ........ 523/200 |
| 4,492,686 A | 1/1985 | Guillon et al. | |
| 4,608,401 A | 8/1986 | Martin | |
| 4,664,714 A | 5/1987 | Katsura et al. | |
| 4,680,332 A | 7/1987 | Hair et al. | |
| 4,758,639 A | 7/1988 | Koyanagi et al. | |
| 4,877,451 A | 10/1989 | Winnik et al. | |
| 4,880,432 A | 11/1989 | Egan et al. | |
| 5,023,159 A | 6/1991 | Ong et al. | |
| 5,053,441 A | 10/1991 | Biale | |
| 5,073,171 A | 12/1991 | Eaton | |
| 5,139,915 A | 8/1992 | Moffat et al. | |
| 5,145,518 A | 9/1992 | Winnik et al. | |
| 5,250,107 A | 10/1993 | Bares | |
| 5,304,244 A | 4/1994 | Goldmann et al. | |
| 5,543,219 A | 8/1996 | Elwakil | |
| 5,554,739 A | 9/1996 | Belmont | |
| 5,707,432 A | 1/1998 | Adams et al. | |
| 5,786,410 A | 7/1998 | Foucher et al. | |
| 5,851,274 A | 12/1998 | Lin | |
| 5,851,280 A | 12/1998 | Belmont et al. | |
| 5,852,073 A | 12/1998 | Villiger et al. | |
| 5,958,121 A | 9/1999 | Lin | |
| 5,969,005 A | 10/1999 | Yamashita et al. | |
| 5,969,033 A | 10/1999 | Pearlstine | |
| 6,103,006 A | 8/2000 | DiPietro | |
| 6,309,452 B1 | 10/2001 | Beach et al. | |
| 6,538,047 B1 | 3/2003 | Miyabayashi | |
| 6,616,946 B1 | 9/2003 | Meier et al. | |
| 6,712,894 B2 | 3/2004 | Shepard | |
| 6,790,878 B2 | 9/2004 | Kurabayashi | |
| 6,811,598 B1 | 11/2004 | Micale | |
| 6,835,393 B2 | 12/2004 | Hoffman et al. | |
| 6,841,591 B2 | 1/2005 | Vincent et al. | |
| 6,894,105 B2 | 5/2005 | Parent et al. | |
| 7,008,977 B2 | 3/2006 | Sakai et al. | |
| 7,018,953 B2 | 3/2006 | Gore et al. | |
| 7,086,732 B2 | 8/2006 | Kasperchik et al. | |
| 7,119,133 B2 | 10/2006 | Vincent et al. | |
| 7,184,199 B2 | 2/2007 | Van Brocklin et al. | |
| 2003/0144376 A1 * | 7/2003 | Vincent et al. | .............. 523/160 |
| 2003/0195291 A1 | 10/2003 | Lamprey et al. | |
| 2003/0205171 A1 | 11/2003 | Adams et al. | |
| 2003/0213410 A1 | 11/2003 | Adams et al. | |
| 2003/0217672 A1 | 11/2003 | Palumbo | |
| 2004/0007152 A1 | 1/2004 | Palumbo | |
| 2004/0024100 A1 | 2/2004 | Parent et al. | |
| 2005/0228071 A1 * | 10/2005 | Vasudevan | .................. 523/160 |
| 2006/0089421 A1 * | 4/2006 | Vasudevan | .................. 523/160 |
| 2006/0089422 A1 * | 4/2006 | Vasudevan | .................. 523/160 |
| 2006/0094796 A1 | 5/2006 | Vasudevan | |
| 2006/0207473 A1 | 9/2006 | Vasudevan | |

FOREIGN PATENT DOCUMENTS

| | | |
|---|---|---|
| JP | 03199494 A | 8/1991 |
| JP | 09-279073 | 10/1997 |
| JP | 01-040235 | 2/2001 |
| WO | 9842799 A1 | 10/1998 |
| WO | WO 98/42799 A | 10/1998 |
| WO | 0125340 A1 | 4/2001 |

(Continued)

OTHER PUBLICATIONS

Machine translation of JP 09-279073.

(Continued)

Primary Examiner—Vasu Jagannathan
Assistant Examiner—Alexander C Kollias (57) ABSTRACT

A polymeric colorant comprises a polymer-encapsulated pigment, wherein the polymer has a molecular weight in the range of 2,000 to 2,000,000 g/mole (2 to 2,000 kDa) and is a polymerization product of at least one dye-monomer conjugate. In some instances, a comonomer is added. The polymeric colorant is made by a method that comprises polymerizing at least one dye-monomer conjugate in a mixture containing pigment particles, to produce a polymerization product wherein the pigment particles are encapsulated by the polymerization product.

13 Claims, 3 Drawing Sheets

FOREIGN PATENT DOCUMENTS

| WO | WO 01/25340 A | 4/2001 |
|----|---------------|--------|
| WO | WO 01/51566 | 7/2001 |
| WO | 2005095531 A1 | 10/2005 |
| WO | 2006024099 A1 | 3/2006 |
| WO | WO 2007/006636 A2 | 1/2007 |
| WO | WO 2007/006682 A1 | 1/2007 |

OTHER PUBLICATIONS

Madras et al., Polymeric Dye Inkjet Colorants with High Waterfastness, Society for Imaging Science and Technology, NIP24 and Digital Fabrication 2008, Eastman Kodak, pp. 355-358.

S. Vasudevan, Final Office Action dated Jul. 21, 2010, U.S. Appl. No. 11/239,738, filed Sep. 29, 2005.

S. Vasudevan, Response to Office Action dated Dec. 22, 2009, U.S. Appl. No. 11/239,738, filed Sep. 29, 2005.

S. Vasudevan, Office Action dated Dec. 22, 2009, U.S. Appl. No. 11/239,738, filed Sep. 29, 2005.

S. Vasudevan, Response to Office Action dated May 29, 2009, U.S. Appl. No. 11/239,738, filed Sep. 29, 2005.

S. Vasudevan, Office Action dated May 29, 2009, U.S. Appl. No. 11/239,738, filed Sep. 29, 2005.

S. Vasudevan, Response to Restriction Requirement dated Jan. 12, 2009, -U.S. Appl. No. 11/239,738, filed Sep. 29, 2005.

S. Vasudevan, Restriction Requirement dated Jan. 12, 2009, U.S. Appl. No. 11/239,738, filed Sep. 29, 2005.

S. Vasudevan, Response to Restriction Requirement dated Sep. 22, 2008, U.S. Appl. No. 11/239,738, filed Sep. 29, 2005.

S. Vasudevan, Restriction Requirement dated Sep. 22, 2008, U.S. Appl. No. 11/239,738, filed Sep. 29, 2005.

S. Vasudevan, Examiner's Answer dated Jun. 10, 2010, U.S. Appl. No. 11/058,006, filed Feb. 14, 2005.

S. Vasudevan, Appeal Brief filed Mar. 18, 2010, U.S. Appl. No. 11/058,006, filed Feb. 14, 2005.

S. Vasudevan, Final Office Action dated Dec. 22, 2009, U.S. Appl. No. 11/058,006, filed Feb. 14, 2005.

S. Vasudevan, Response to Office Action dated Jun. 10, 2009, U.S. Appl. No. 11/058,006, filed Feb. 14, 2005.

S. Vasudevan, Office Action dated Jun. 10, 2009, -U.S. Appl. No. 11/058,006, filed Feb. 14, 2005.

S. Vasudevan, Request for Continued Examination and Response to Final Office Action dated Dec. 1, 2008, U.S. Appl. No. 11/058,006, filed Feb. 14, 2005.

S. Vasudevan, Advisory Action filed Feb. 23, 2009, -U.S. Appl. No. 11/058,006, filed Feb. 14, 2005.

S. Vasudevan, Response to Final Office Action dated Dec. 1, 2008, U.S. Appl. No. 11/058,006, filed Feb. 14, 2005.

S. Vasudevan, Final Office Action dated Dec. 1, 2008, U.S. Appl. No. 11/058,006, filed Feb. 14, 2005.

S. Vasudevan, Response to Office Action dated May 15, 2008, U.S. Appl. No. 11/058,006, filed Feb. 14, 2005.

S. Vasudevan, Office Action dated May 15, 2008, -U.S. Appl. No. 11/058,006, filed Feb. 14, 2005.

S. Vasudevan, Response to Restriction Requirement dated Jan. 11, 2008, -U.S. Appl. No. 11/058,006, filed Feb. 14, 2005.

S. Vasudevan, Restriction Requirement dated Jan.11, 2008, U.S. Appl. No. 11/058,006, filed Feb. 14, 2005.

* cited by examiner (1)

POLYMERIZABLE DYE-MONOMER CONJUGATES FOR ENCAPSULATING PIGMENT PARTICLES

BACKGROUND

Colorants are widely used in a variety of applications to provide a useful and aesthetic appearance to articles and printed images. Standard colorants are most often classified as either pigments or dyes. For some applications, colorants are directly mixed into an article of manufacture. In other applications, ink compositions containing colorants are used for printing of color images. Such ink compositions typically include a liquid vehicle such as an appropriate solvent containing the dye or the pigment. Dye-based inks generally contain a colorant that is soluble in the given liquid vehicle, while pigmented inks contain an insoluble dispersed solid colorant to achieve color. Some colorants comprise both dyes and pigments.

Dye and pigment colorants each have certain properties that are beneficial in certain circumstances and which can provide predetermined color properties to a printed image. However, dyes and pigments also have various limitations and drawbacks which can limit the choice of dyes and pigments for particular applications. Dyes typically exhibit good chroma and long-term stability in solution, however, they tend to have poor waterfastness, lightfastness and smear resistance. In contrast, pigment colorants usually provide good waterfastness, good lightfastness and good smear resistance, but they generally have limited chroma and are typically insoluble in the liquid vehicle. The discrete pigment particles tend to clump or agglomerate if they are not stabilized in the vehicle. To prevent pigments from agglomerating or settling out of a liquid suspension, any of a number of approaches can be taken to stabilize the pigments in dispersed form.

With respect to ink-jet inks, stable pigment dispersions, dispersants or surfactants are customarily added to the ink vehicle. The dispersant is typically a polymer formed by polymerizing hydrophobic monomers, hydrophilic monomers, hydrophobic copolymers, and/or hydrophilic copolymers. The dispersant binds to a surface of the pigment, providing stability to the pigment dispersion. When printing is desired, the pigment is precipitated from the ink-jet ink and onto the print medium by solvent evaporation. This process may be enhanced by the presence of salts, acids, or polymers in the print medium, to provide printed images with improved durability and gloss. In many cases a large amount of the dispersant is needed to produce these desirable properties, which increases the viscosity of the ink, detrimentally affecting the firing reliability and print quality of ink-jet pens.

Another approach to stabilizing a pigment in an ink-jet ink involves modifying the surface of the pigment to include covalent attachment of polymeric or organic groups. The surface-modified pigments are referred to in the art as "self-dispersed pigments" or "polymer-attached pigments." Using surface-modified pigments offers more latitude in ink formulation and reduces the viscosity of the ink compared to those that contain dispersants. The presence of any unbound polymeric or organic groups, however, would tend to detrimentally increase the viscosity of the ink. This, in turn, can lead to nozzle clogging in ink-jet pens.

Various polymer-dispersed pigments in which the pigment is encapsulated with a polymer having hydrophilic and hydrophobic moieties have been reported, some of which are stable in the liquid vehicle at a pH of from about 5.5 to about 8.5. Ink-jet inks including certain polymer-attached pigments with a variable particle size have been investigated. Polymeric colorants that include a pigment having a covalently attached polymer have been described in which a dye is covalently attached to the polymer. In some instances, a dispersant can be covalently attached to one or more of the pigment, the polymer and the dye. There is continuing interest in developing additional polymeric colorants and ink formulations, especially those which combine dye and pigment colorants.

SUMMARY

In accordance with certain embodiments of the invention, a polymeric colorant is provided which comprises a polymer-encapsulated pigment in which the polymer has a molecular weight in the range of 2000 to 2,000,000 g/mole The encapsulating polymer is a polymerization product of at least one dye-monomer conjugate. In embodiments, a comonomer is copolymerized with the dye-monomer conjugate.

Also provided in accordance with certain embodiments of the invention is a method of making a polymeric colorant. The method includes polymerizing at least one dye-monomer conjugate in a mixture containing pigment particles, to produce a polymerization product while simultaneously encapsulating the pigment particles.

In still other embodiments of the invention, an ink-jet ink is provided which comprises a liquid vehicle and an above-described polymeric colorant suspended in the vehicle. These and other embodiments, features and advantages will be apparent in the description and drawing which follow.

NOTATION AND NOMENCLATURE

In the following discussion and in the claims:

The terms "including" and "comprising" are used in an open-ended fashion, and thus should be interpreted to mean "comprising, but not limited to . . . "

The singular forms "a," "an," and "the" include plural referents unless the context clearly dictates otherwise. Thus, for example, reference to "a dye" includes reference to one or more of such materials.

The term "liquid vehicle" is defined to include liquid compositions that can be used to carry colorants, including pigments, to a substrate. Liquid vehicles are well known in the art, and a wide variety of liquid vehicle components may be used in accordance with embodiments of the present exemplary system and method. Such liquid vehicles may include a mixture of a variety of different agents, including without limitation, surfactants, solvents, co-solvents, buffers, biocides, viscosity modifiers, sequestering agents, stabilizing agents, and water. Though not liquid per se, the liquid vehicle can also carry other solids, such as polymers, UV curable materials, plasticizers, cosolvents, salts, etc.

"Pigment" refers to a colorant particle which is substantially insoluble in the liquid vehicle in which it is used.

"Functionalized" refers to pigment particles which have a compound chemically attached via covalent bonds. This is in contrast to pigment particles which have compounds attached via ionic bonds or other weaker intermolecular forces.

The term "diameter," when referring to a pigment particle, has its usual meaning and also includes the longest characteristic dimension of a non-spherical particle.

"Dye" refers to a colorant compound which is substantially soluble in the liquid vehicle in which it is used.

"Bleed" refers to the tendency of ink to run into and mix with adjacently printed inks. Bleed typically occurs prior to adjacently printed inks fully drying on a substrate. The degree of bleed will depend on a variety of factors such as the drying speed of the ink, ink chemistry, i.e., the presence of reactive or non-reactive bleed control mechanisms, and type of substrate, among other variables.

"Reactive," when referring to ink sets, refers to a chemical reaction between two or more ink-jet inks. Such reactive ink sets can interact either by salt mechanisms, pH differential mechanisms, polymerization mechanisms, or other reactive mechanisms known to those skilled in the art.

"Waterfastness" refers to an ink's exhibited degree of water resistance after printing on a substrate. Typically, this property is measured after the ink has dried, and measures the tendency of the ink to smear or otherwise change location in the presence of moisture.

"Chroma" refers to the attribute of color used to indicate the degree of departure of the color from gray of the same lightness as defined by ASTM (ASTM E 284). It is also used to refer to degree of saturation of color which is the ratio of chroma over lightness (C*/L*). Typically, dye colorants have a greater degree of saturation than pigment colorants having the same, or substantially the same, hue.

"Neutral gray" refers to a shade of gray which exhibits a substantial color constancy, i.e., substantially no change in color appearance when viewed under different light sources such as fluorescent and sunlight. Further, non-neutral gray colors also tend to have a subtle red or brown shade or appearance. In addition, neutral gray or black inks have very little to no chroma through the ink density ramp at different L* values.

"In-situ polymerization" refers to polymerizing one or more monomers in the presence of a pigment to simultaneously prepare a polymer-encapsulated (polymer-dispersed) pigment.

"Encapsulated pigment" refers to a pigment that is at least partially covered by a polymer, and in some cases is substantially or completely covered. The polymer can physically surround the pigment and be attached thereto by covalent bonds and/or intermolecular attractive forces.

"Stable" indicates that a pigment remains dispersed in a vehicle over an extended period of time, e.g., a useful commercial shelf-life.

"Substantially the same" allows for a degree of deviation that is sufficiently small so as to not measurably detract from the identified property or circumstance. The exact degree of deviation allowable may in some cases depend on the specific context. Thus, for example, a colorant which has a color "substantially" that of another colorant may deviate in color, i.e., hue, or other relevant property within a range which is imperceptible or nearly imperceptible upon visual inspection. Of course, other properties can vary considerably. For example, a black pigment can have substantially the same color and hue as a black dye; however, chroma, optical density, gloss, solubility, and the like can differ dramatically from one another. Conversely, identification of a property which is "substantially different" indicates a visible and/or measurable degree of difference.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

DETAILED DESCRIPTION

To improve plain paper as well as porous photo media performance of pigment based inks, a wide variety of desirable polymeric colorants are made by first covalently attaching a highly chromatic dye to a polymerizable monomer. The resultant dye-monomer conjugate is then polymerized in situ, in the presence of pigment particles, to encapsulate the pigment in the same process step. Embodiments of this method of producing an encapsulated pigment (i.e., polymeric colorant) impart many of the benefits of dye-conjugate polymers to pigment encapsulation while retaining the enhanced stability and durability properties of the latter.

In Situ Polymerization of Dye-Monomer Conjugates

A dye is attached to a monomer such that the resultant dye-monomer conjugate can be subsequently polymerized in the presence of a selected pigment to simultaneously form, in situ, a polymer-encapsulated pigment.

Dyes. Suitable dyes are those that have an active group which can be reacted to form bonds with a selected monomer to form a dye-monomer conjugate. For example, dyes having active groups such as hydroxy, amine, carboxylic acid, sulfonic acid, thiol, alkyl halide, halotriazine, maleimide and vinyl sulfone, and combinations thereof can readily form covalent bonds with many monomers. Alternatively, dyes having active groups such as anhydride, carboxyl, sulfonyl, or a similar group can be reacted with monomers having amine or alcohol groups. Thus, the reactive and active groups mentioned above can be present in either the dye or the monomer, depending on a specific embodiment. The dyes and monomers may also include other functional groups that can be readily converted to any of the above mentioned groups so that they may be coupled after such conversion. Those skilled in the art will recognize various coupling reactions and associated reactive groups that may be used to couple a wide variety of dyes and monomers.

Non-limiting examples of suitable types of dyes are food dyes, FD&C dyes, acid dyes, direct dyes, reactive dyes, phthalocyanine dyes, derivatives of phthalocyanine sulfonic acids, and combinations of those. Representative examples of suitable dyes are C.I. Acid Red 440, C.I. Reactive Red 3, C.I. Reactive Red 13, C.I. Reactive Red 23, C.I. Reactive Red 24, C.I. Reactive Red 33, C.I. Reactive Red 43, C.I. Reactive Red 45, C.I. Reactive Red 120, C.I. Reactive Red 180, C.I. Reactive Red 194, C.I. Reactive Red 220, C.I. Reactive Violet 4, C.I. Reactive Blue 19, C.I. Reactive Blue 5, C.I. Reactive Blue 49, C.I. Reactive Yellow 2, C.I. Reactive Yellow 3, C.I. Reactive Black 39, and combinations of those.

Dyes having active groups such as alcohols and aromatic amines tend to not be very nucleophilic. In those cases, attachment of the dye to the monomer is enhanced by addition of a nucleophilic catalyst such as dimethylaminopyridine, N-methylimidazole, and the like. Additionally, reactive dyes such as those having vinyl sulfone groups can be attached to a monomer via a dye linking group such as a thiol, e.g., using known Michael addition chemistry. For example, 2-aminoethanethiol can be reacted with a monomer having an anhydride or other reactive group. The thiol group can then be reacted with a reactive dye in the presence of sodium hydroxide to form a dye-monomer conjugate. In any case, the dye and monomer are selected such that the resulting dye-monomer conjugate is polymerizable in the presence of the selected pigment particles and simultaneously encapsulates the pigment.

Pigments. Suitable pigments for in situ encapsulation include black pigments, white pigments, cyan pigments, magenta pigments, yellow pigments, and the like. The pigments can be organic or inorganic particles, such as carbon black, titanium oxide, cobalt blue ($CoO$—$Al_2O_3$), chrome yellow ($PbCrO_4$), and iron oxide. Suitable organic pigments are, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation.

Suitable black pigments include various carbon pigments. The carbon pigment can be almost any commercially available carbon pigment that provides acceptable optical density and print characteristics. Examples include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Representative carbon black pigments are Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V. The above-mentioned pigments include unmodified pigment particulates, small molecule attached pigment particulates, and polymer-dispersed pigment particulates.

There are also a wide variety of colored pigments that are suitable for in situ polymerization encapsulation, and include blue, brown, cyan, green, white, violet, magenta, red, orange and yellow, and mixtures thereof. The following color pigments are available from Cabot Corp.: CABO-JET 250C, CABO-JET 260M, and CABO-JET 270Y. The following color pigments are available from BASF Corp.: PALIOGEN Orange, PALIOGEN Orange 3040, PALIOGEN Blue L6470, PALIOGEN Violet 5100, PALIOGEN Violet 5890, PALIOGEN Yellow 1520, PALIOGEN Yellow 1560, PALIOGEN Red 3871K, PALIOGEN Red 3340, HELIOGEN Blue L 6901F, HELIOGEN Blue NBD 7010, HELIOGEN Blue K 7090, HELIOGEN Blue L 7101F, HELIOGEN Blue L6900, L7020, HELIOGEN Blue D6840, HELIOGEN Blue D7080, HELIOGEN Green L8730, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, IGRALITE Blue BCA, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, HOSTAPERM Orange GR, HOSTAPERM Scarlet GO, HOSTAPERM Pink E, Permanent Rubine F6B, and the HOSTAFINE series. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow. Other representative examples of pigments include Normandy Magenta RD-2400, Permanent Violet VT2645, Argyle Green XP-111-S, Brilliant Green Toner GR 0991, Sudan Blue OS, PV Fast Blue B2G01, Sudan III, Sudan II, Sudan IV, Sudan Orange G, Sudan Orange 220, Ortho Orange OR 2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, and Lithol Fast Scarlet L4300; and TIPURE R-101. These pigments are available from commercial sources such as Hoechst Celanese Corporation, Paul Uhlich, BASF, American Hoechst, Ciba-Geigy, Aldrich, DuPont, Ugine Kuhlman of Canada, Dominion Color Company, Magruder, and Matheson. Still other suitable colored pigments are described in the Colour Index, 3rd edition (The Society of Dyers and Colourists, 1982).

In some instances the pigment surface is functionalized, to be more amenable to encapsulation than an unfunctionalized bare surface. For example, a suitably functionalized surface is employed when it is desired to incorporate a dye-monomer conjugate in a system in which the polymer is built on the surface of the pigment by a controlled radical polymerization process, such as atom transfer radical polymerization (ATRP).

A. Dye-monomer Conjugates. A bright dye, which may be either water soluble or hydrophobic, is conjugated to a monomer which contains a vinyl group (e.g., acrylate, methacrylate, styrene, vinyl alcohol, allyl amine and other similar groups). Other examples of dye-methacrylate conjugates are described in U.S. Pat. No. 6,894,105, including fluorochemical (meth)acrylate monomers such as 1,1-dihydroperfluorobutyl (meth)acrylate, 1,1-dihydropentafluoropropyl (meth)acrylate, hexafluoroisopropyl (meth)acrylate, 2,2,3,3,4,4,4-heptafluorobutyl (meth)acrylate, 2,2,3,4,4,4-hexafluorobutyl (meth)acrylate, 2,2,3,3-tetrafluoropropyl (meth)acrylate, 1,1-dihydroperfluorocyclohexylmethyl (meth)acrylate, 1-pentafluoroethyl-2-(trifluoromethyl)propyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,8-tridecafluorooctyl (meth)acrylate, N-methyl perfluorooctanesulfonamidoethyl (meth)acrylate, N-ethyl perfluorohexylsulfonamidoethyl (meth)acrylate, and N-methyl perfluorobutanesulfonamidoethyl (meth)acrylate.

Figure 1:
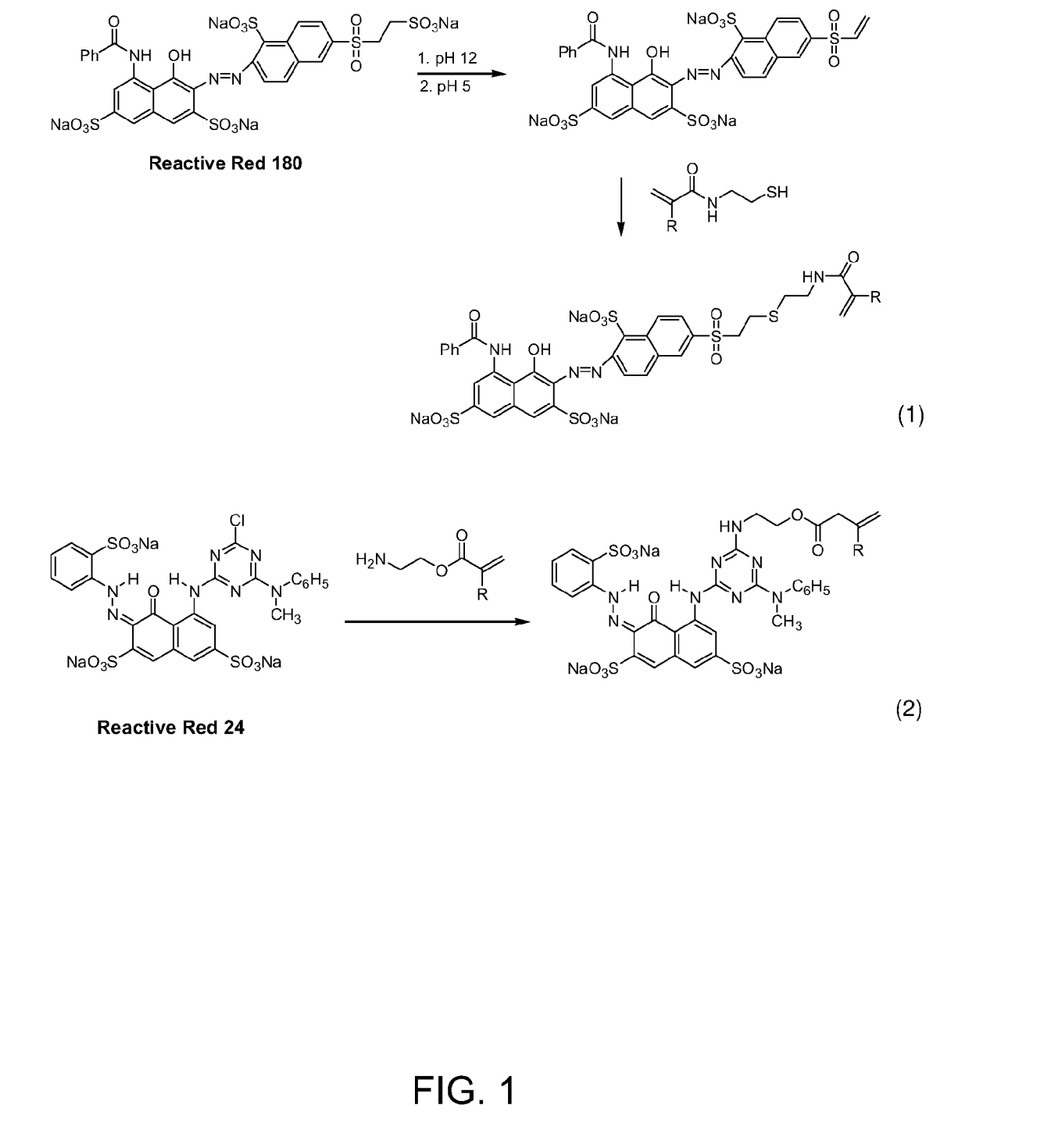
FIG. 1 illustrates two exemplary reactions in which a representative dye, Reactive Red 180, is conjugated to 2-mercaptoethyl (meth)acrylamide monomer (Reaction 1), and another representative dye, Reactive Red 24, is conjugated to 2-aminoethyl (meth)acrylate monomer (Reaction 2).

Representative dye-monomer conjugates are schematically shown by Reactions 1 and 2 in FIG. 1. In Reaction 1, Reactive Red 180 is covalently attached to 2-mercaptoethyl (meth)acrylamide. Though it is shown as a two step process where the vinyl sulfone is formed in the first step to which 2-mercaptoethyl(meth)acrylamide is added in the second step, those skilled in the art would readily recognize other ways of attaching the monomer to the reactive dye. For example, 2-mercaptoethylamine could be added to the vinyl sulfone, and the resultant product could be treated with (meth)acryloyl chloride to give the same final product.

In Reaction 2, Reactive Red 24 is conjugated to 2-aminoethyl methacrylate in a straight forward aromatic nucleophilic substitution reaction in which the chlorine atom on the chlorotriazine group is replaced with the amine group of the monomer.

After formation of the dye-monomer conjugate, the selected pigment is added and a suspension or emulsion is formed. Polymerization of this dye-monomer conjugate, optionally with other comonomers, can be carried out in the presence of pigment dispersions to give polymer encapsulated pigment particles. Such polymerizations may be carried out by free radical addition of a monomer mixture through emulsion polymerization using well known techniques.

The selected pigments are added singly, or in combination of two or more, to the dye-monomer conjugate solution in a polymerization suspension or emulsion. Typically, the pigments are from about 10 nm to about 10 μm in diameter (or in their longest characteristic dimension if the particles are non-spherical). In some instances the selected particles are from 10 nm to about 500 nm in diameter. In some instances particle sizes outside these ranges may be used provided that the pigment can remain dispersed and provide adequate color properties for the intended application.

In some instances it is desirable that the pigment and the dye have substantially the same color. In this way, the polymeric colorant (i.e., the polymer encapsulated pigment) may have improved chroma resulting from the presence of dye, while also improving lightfastness, waterfastness, and permanence as a result of the pigment. In other instances, the pigment and the dye are different colors.

When dye-monomers of both cyan and magenta chromophores are used along with other comonomers to encapsulate carbon black, the resultant dispersion may be used to produce a neutral photo black ink. For example, the pigment may be a black color and the dye a cyan or magenta color such that the resultant polymeric colorant has an effective color which is a neutral gray. In still other instances, all of cyan, magenta, and yellow dye-monomer conjugates in appropriate proportions are copolymerized in the presence of the pigment to simultaneously produce the encapsulated pigment. Thus, in general terms, more than one type of dye can be attached to the resultant polymer chains which encapsulate one or more types of pigment.

B. Multiple Dye-monomer Conjugates and/or Comonomers. The resultant dye-monomer conjugate may be copolymerized with one or more other suitable monomers to provide predetermined desirable properties to the resultant polymer. In some instances, two or more dye-monomer conjugates are polymerized together, each additional dye having a substantially different color than the first dye. For example, a hue angle difference of 75 degrees or more would clearly indicate a substantially different color. As a guideline, hue angle differences are roughly 90 degrees from red to yellow, yellow to green, and green to blue.

In some instances, one or more comonomers (with or without a conjugated dye) is selected for tailoring the chemical and/or physical properties of the resultant polymer. For example, acrylic acid and/or methacrylic acid may be used to give carboxylate functionality for electrostatic stabilization of the resulting polymer-encapsulated pigment. Allyl amine, vinyl pyridine, and the like, may be used to provide electrostatic stabilization with a positive charge. Butyl acrylate, 2-ethylhexyl acrylate, and similar monomers may be chosen to reduce the glass transition temperature (Tg) of the resultant polymer). When the dye-monomer conjugates are copolymerized with amine-containing monomers such as allylamine or vinylpyridine to encapsulate the selected pigments, the resultant polymer-encapsulated pigments are amphoteric. This property may be exploited to achieve robust bleed control against black, as well as to produce secondary colors of high C*/L*. For example, such amphoteric color dispersion may be formulated into an ink at a low pH. When this color ink is printed against a black ink that is formulated at a higher pH using anionically stabilized black dispersion, robust black to color bleed control may be realized. Similarly, an amphoteric magenta dispersion may be formulated into an ink at a low pH so that it is stabilized only by cationic charges. Another amphoteric yellow dispersion may be formulated into an ink at a high pH so that it is stabilized by anionic charges. When these inks are printed together to make red, the resultant red would be very saturated independent of the media on which it is printed. Other combinations of inks to exploit this behavior would be readily apparent to those skilled in the art.

The selected dye is derivatized with a polymerizable group (adduct) such that the resultant dye-monomer conjugate may be copolymerized with one or more other suitable monomer. Once the dye-monomer conjugate is formed, by reaction between the dye derivative and adduct, it is copolymerized with one or more other vinyl containing monomers including, but not limited to, those illustrated in Reactions 1 through 3, or styrene, acrylic acid, methacrylic acid, benzyl acrylate, butyl acrylate, and the like. In the exemplary formulas in FIGS. 1-2, R can be either H or a methyl group.

Figure 2:
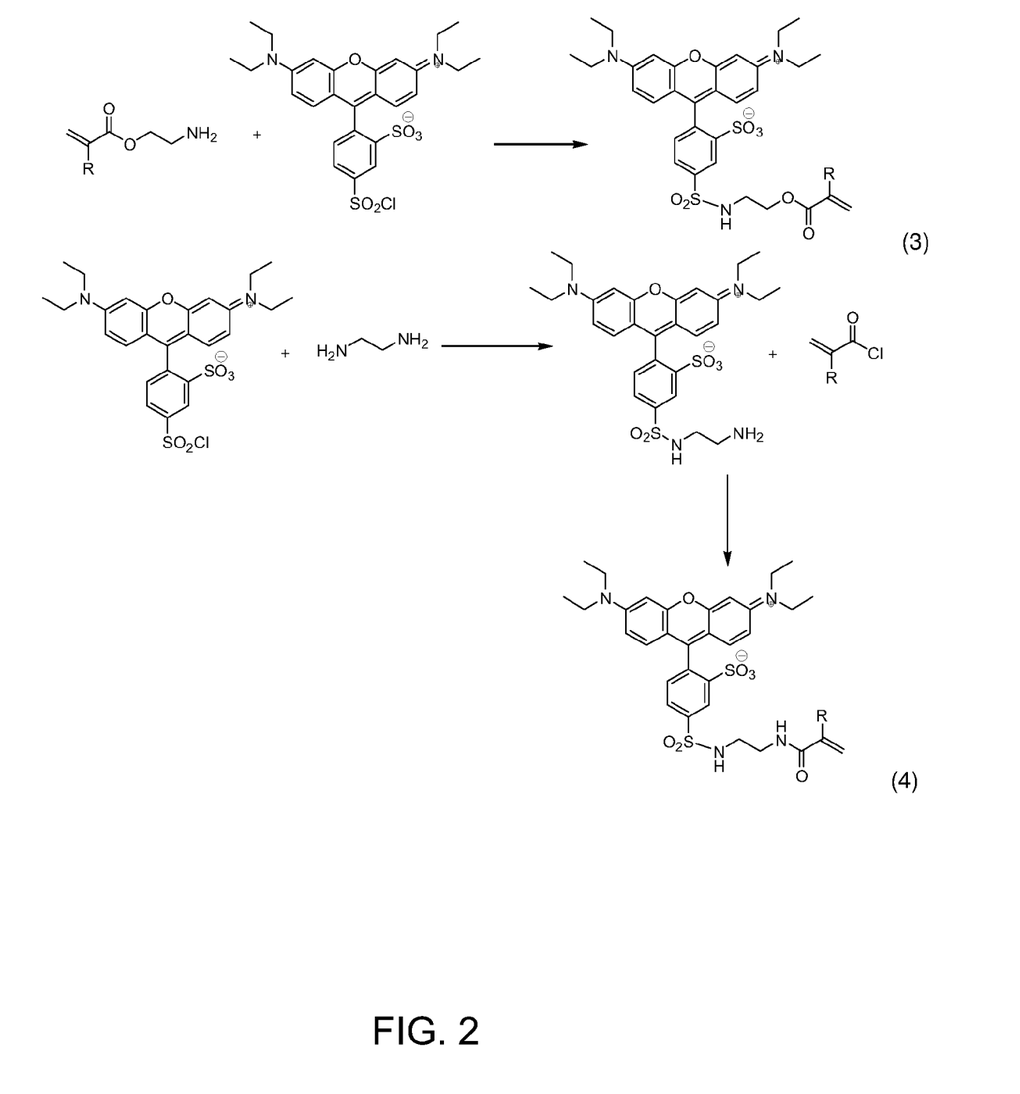
FIG. 2 illustrates two exemplary reactions in which a representative dye Acid Red 52 (AR52) is modified with a polymerizable monomer. In the first exemplary reaction (Reaction 3), the acid chloride form of AR52 is treated with 2-aminoethyl (meth)acrylate. In the second exemplary reaction (Reaction 4), the same acid chloride is first conjugated to one of the two amine groups of ethylenediamine, and subsequently the other amine group is conjugated to (meth)acryloyl chloride.

The formation of a dye-monomer conjugate and its combination with another polymerizable monomer is illustrated in Reactions 3 and 4 of FIG. 2. In Reaction 3, a dye derivative, such as lissamine rhodamine sulfonyl chloride (also known as xanthylium, 9-[4-(Chlorosulfonyl)-2-sulfophenyl]-3,6-bis (diethylamino)-, inner salt (9CI) or (LRSC), which is a dye derivative of Acid Red 52), is combined with 2-aminoethyl methacrylate to form a polymerizable dye-monomer conjugate for CO-polymerizing with a monomer containing a vinyl group. The co-polymerization is performed in situ with a selected pigment to produce a polymer encapsulated pigment wherein the polymer contains attached dye molecules. Similarly, in Reaction 4, LRSC is combined with a suitable adduct. One such adduct is ethylenediamine, as illustrated in Reaction 4. The product of this addition reaction may then be reacted with acryloyl or methacryloyl chloride, as illustrated further in Reaction 4, to produce a polymerizable dye-monomer conjugate.

Copolymerizing a dye-monomer conjugate with one or more suitable comonomers, allows for the preparation of a polymeric dye that includes both cyan and magenta chromophores, for example. In that case, each of the colorant monomers of the resulting polymer includes either a cyan or a magenta chromophore, with the other chromophore being included in the other colorant monomer. The ability to create a polymeric dye that includes a plurality of dye chromophores allows for the formation of a black ink. More specifically, such a polymeric dye can be used to encapsulate carbon black to get a neutral black or gray ink for use as a photo black or gray ink.

Figure 3:
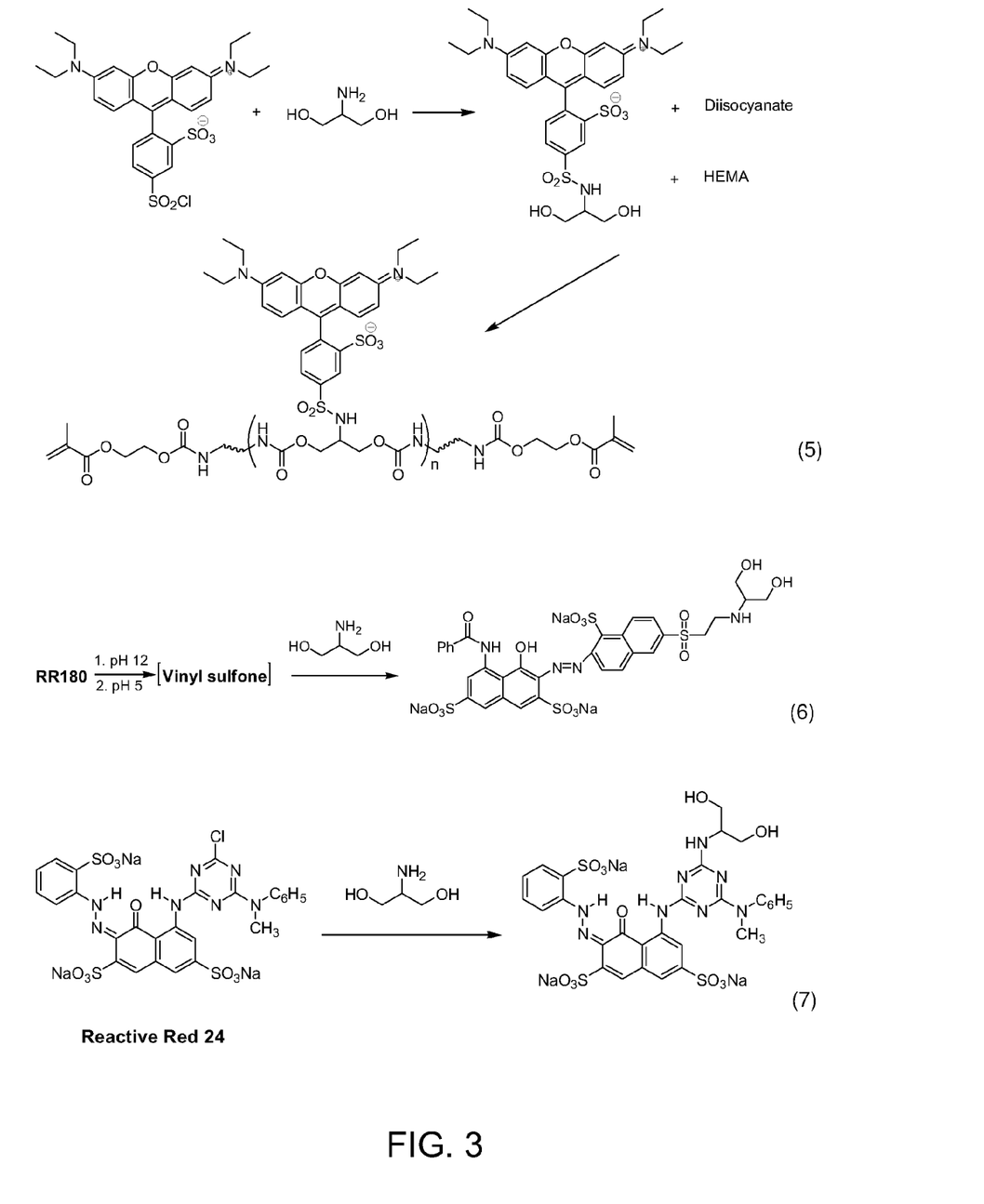
FIG. 3 illustrates three exemplary reactions in which representative dyes and monomers are used to form pre-polymers, for polymerizing together with a cross linker. In the first exemplary reaction sequence (Reaction 5), the acid chloride of the dye AR52 is reacted with the amine group of 2-amino-1,3-propanediol and the resultant product is treated with a suitable diisocyanate such as toluenediisocyanate (TDI) or hexamethylenediisocyanate (HMDI) and 2-hydroxyethyl methacrylate (HEMA). The second and third exemplary reactions (Reactions 6 and 7) illustrate the modification of reactive red 180 (RR180) and reactive red 24 (RR24) respectively with the same diol. In each case, the diol may further be reacted with a suitable diisocyante and HEMA to make a polyurethane prepolymer.

C. Pre-polymers with Dye-monomer Conjugates. In still another approach, dye-monomer conjugates prepared as described above are used to synthesize other classes of polymers. A polyurethane pre-polymer is prepared from a suitable dye and monomer, as described above, along with a suitable di-isocyanate (for example, hexamethylenediisocyanate or HMDI) and a cross linkable other group (for example, hydroxyethyl methacrylate or HEMA). Representative examples of dye derivatives suitable for preparation of polyurethane pre-polymers are illustrated by Reactions 5, 6 and 7 of FIG. 3. In the first step of Reaction 5, the acid chloride of the dye AR52 is reacted with a diol containing an amine group (2-amino-1,3-propanediol). The resultant product is further treated with diisocyantes such as hexamethylene diisocyanate (HMDI) or toluene diisocyante (TDI) and 2-hydroxyethyl methacrylate (HEMA) to give a polyurethane terminated with polymerizable methacrylate groups on either end. In addition, other diols containing carboxylic acid groups may be used to generate the polyurethane carrying carboxylic acid functional groups. Reactions 6 and 7 demonstrate ways to derivatize the reactive dyes RR180 and RR24, respectively, with 2-amino-1,3-propanediol. It would be understood by those skilled in the art that the products may also be used to prepare polyurethane similar to that shown in Reaction 5. This approach leads to pigment dispersions in which the encapsulating polymer has different polymer types in different segments. For example, the segments may be polyurethanes and polyacrylates.

Encapsulation Polymers

Employing one of the above-described approaches for polymerizing, in situ, a dye-monomer conjugate and simultaneously encapsulating a selected pigment, the extent of attached dye molecules in the resultant polymer chains will vary depending on the specific reaction conditions, the polymer, the comonomer, if any, and the dye. However, as a general guideline, the dye molecule to polymer chain ratio typically ranges from about 0.05 mmol/g to about 10 mmol/g, and in some cases from about 1 mmol/g to about 5 mmol/g, i.e., mmol of dye molecules per gram of polymer. Thus, the number of dye molecules per pigment particle ranges from about 10 μmole dye molecules per gram of pigment to about 100 mmole per gram of pigment, and in some cases from about 0.05 mmole dye per gram of pigment to about 2 mmole per gram pigment. In some embodiments the polymerization product forms an encapsulating layer on the surface of the pigment particles having a thickness in the range of about 2 nm to 2 microns.

When selecting monomers and comonomers, and endeavoring to beneficially affect the characteristics of the resultant polymerization product which will encapsulate the selected pigment, several properties or conditions may be considered. For example, in an ink-jet ink the acidity of the formulation and the polymeric molecular weight of the encapsulation polymer affect the dispersability and durability of the encapsulated pigments. Though any functional molecular weight can be used, it has been discovered that polymers having a molecular weight from about 2,000 Mw to about 2,000,000 Mw (corresponding to about 2 kDa to 2,000 kDa) are preferable, while those having a molecular weight from about 5,000 Mw to about 200,000 Mw are particularly desirable for use. Molecular weight of the polymer is determined by gel permeation chromatography using polystyrene as a standard substance and tetrahydrofuran (THF) as a solvent. Polymers with very high molecular weights may be characterized by light scattering as well. The higher molecular weight polymers tend to provide better durability, and when they are made in situ in the presence of the pigment, the viscosity is not too high and the dispersion is suitable for inkjet applications. Acid functional groups on the surface provide electrostatic stabilization for the pigment dispersions.

Ink-Jet Ink Compositions

The above-described polymeric colorants may be used in a wide variety of applications such as ink compositions and manufactured articles (e.g., molded or extruded plastics). A representative use of the new polymeric colorants is to disperse them in an appropriate liquid vehicle to prepare an ink-jet ink. The dye and pigment components may be substantially the same color or hue, or they may be of different colors, depending on the desired appearance. For some applications, the selected dye color is cyan, magenta, or yellow and the selected pigment color is black. The inclusion of additional dyes in the polymeric colorant may be used to affect any number of properties including, but not limited to, dispersion stability, pH and lightfastness. Any other suitable combination of dye and pigment colors may be used in an ink-jet ink, in accordance with the requirements of a particular application.

Ink-jettable ink compositions containing a new polymeric colorant are typically prepared in an aqueous formulation or ink vehicle which can include water, cosolvents, surfactants, buffering agents, biocides, sequestering agents, viscosity modifiers, humectants, binders, plasticizers, fixers, and/or other known additives. For some end use applications, one or more ink-jet ink containing a new polymeric colorant is used in conjunction with reactive ink sets for enhanced bleed control. Typically, the present ink-jet ink compositions have a viscosity of between about 0.8 to about 8 cps. The ink vehicle usually comprises from about 70% to about 98% by weight of the ink-jet ink composition.

The polymeric colorant comprises from about 1% to about 20% by weight of the ink composition. Of that amount, the pigment particles typically comprise from about 1% to about 20% by weight of the ink-jet ink composition, and in some cases comprise from about 2% to about 5% by weight. The encapsulating polymer usually comprises about 0.1 to 15% by weight of the composition. The dye component of the polymeric colorant usually comprises 0.1 to 12% by weight of the ink-jet ink. Cosolvents can be included in the ink-jet compositions. Suitable cosolvents include water soluble organic cosolvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that employed in some instances include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink to minimize clogging or other properties of the ink such as viscosity, pH, surface tension, optical density, and print quality. The cosolvent concentration typically ranges from about 0 to about 50 wt % by weight of the ink composition.

Various buffering agents can also be used in the ink-jet ink compositions, if desired. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; and other basic or acidic components which do not interfere with the colorant characteristics of the present system and method. If used, buffering agents typically comprise less than about 10% by weight of the ink-jet ink composition.

Various biocides may be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5% by weight of the ink-jet ink composition, and in many instances comprise from about 0.1% to about 0.25% by weight.

Binders are another common component that may be included which act to secure the polymeric colorants on the substrate. Suitable binders typically have a molecular weight of from about 100 to about 50,000 g/mol. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

Other optional components of the ink-jet ink are standard water-soluble surfactants such as alkyl polyethylene oxides, alkyl phenyl polyethylene oxides, polyethylene oxide (PEO) block copolymers, acetylenic PEO, PEO esters, PEO amines, PEO amides, and dimethicone copolyols. Some of these materials are available commercially under the tradenames TERGITOL, SURFYNOL, ZONYL, TRITON, MERPOL, and the like. If used, surfactants are usually from 0.01% to about 10% by weight of the ink-jet ink composition.

Once the ink-jet ink compositions are prepared, they are placed into one or more ink-jet pens as is known in the art. An inkjet pen includes at least one firing chamber, each containing, respectively, a new ink-jet ink composition. An ink-jet pen may have, for example, an orifice plate with a plurality of orifices through which the ink-jet ink composition is delivered to a substrate using thermal, piezoelectric, or other ink-jet technology. A system for printing images on a substrate includes at least one ink-containing ink-jet pen and a suitable print medium, such as plain paper or porous photographic media. Among other potential benefits, a polymeric colorant as disclosed herein potentially imparts enhanced scratch and smudge durability to the selected pigments in the ink-jet ink, while the dye attached to the encapsulating polymer enhances the plain paper saturation performance of the system.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications, including all equivalents of the subject matter of the claims.

What is claimed is:

1. An ink-jet ink comprising:
   an aqueous liquid vehicle; and
   a polymeric colorant suspended in said aqueous liquid vehicle, and comprising polymer-encapsulated pigment particles, wherein said polymer has a molecular weight in the range of 200 to 2,000 kDa and is a polymerization product of at least one dye-monomer conjugate, wherein polymerization is carried out in a dye-monomer conjugate mixture containing pigment particles, wherein said polymeric colorant suspended in said aqueous liquid vehicle is jettable and the ink jet ink has a viscosity from about 0.8 to about 8 cps.

2. The ink-jet ink of claim 1, having a black color.

3. The ink-jet ink of claim 1, wherein said pigments particles have a black color and at least one said dye-monomer conjugate has a cyan or magenta color, such that the ink has a neutral gray color.

4. The ink-jet ink of claim 1, wherein said at least a portion of the pigment particles is selected from the group consisting of black, cyan, magenta and yellow pigments.

5. The ink-jet ink of claim 1, wherein said polymer-encapsulated pigment particles are amphoteric, and impart ink bleed control against black and/or enhanced $C^*/L^*$ in secondary colors to an image printed with the ink.

6. The ink-jet ink of claim 1, wherein said polymer-encapsulated pigment particles contain about 10-100 μmoles of dye per gram of pigment.

7. The ink-jet ink of claim 1, wherein said at least one dye-monomer conjugate comprises a first dye-monomer conjugate and a different second dye-monomer conjugate.

8. The ink-jet ink of claim 7, wherein at least said first and second dye-monomer conjugates have a same color.

9. The ink-jet ink of claim 1, wherein said first dye-monomer conjugate is a different color than at least one other dye-monomer conjugate.

10. The ink-jet ink of claim 1, wherein said pigment particles are a same color as the at least one dye-monomer conjugate.

11. The ink-jet ink of claim 1, wherein said pigment particles are a different color than that of said at least one first dye-monomer conjugate.

12. The ink-jet ink of claim 1, wherein said polymer is a polymerization product of at least one dye-monomer conjugate and at least one comonomer, wherein at least one said comonomer is selected to introduce into said polymerization product an acidic group, a hydrophilic group or a hydrophobic group.

13. The ink-jet ink of claim 1, wherein said polymerization product forms an encapsulating layer on a surface of said pigment particles and said encapsulating layer having a thickness in a range of about 2 nm to 2 microns.

* * * * *

UNITED STATES PATENT AND TRADEMARK OFFICE
CERTIFICATE OF CORRECTION

PATENT NO.         : 7,868,059 B2
APPLICATION NO.    : 11/829593
DATED              : January 11, 2011
INVENTOR(S)        : Sundar Vasudevan et al.

Page 1 of 1

It is certified that error appears in the above-identified patent and that said Letters Patent is hereby corrected as shown below:

In column 13, line 2, in Claim 1, delete "ink jet" and insert -- ink-jet --, therefor.

In column 13, line 6, in Claim 3, delete "pigments" and insert -- pigment --, therefor.

Signed and Sealed this
Eighteenth Day of October, 2011

David J. Kappos
*Director of the United States Patent and Trademark Office*